United States Patent [19]
Becker et al.

[11] Patent Number: 5,069,791
[45] Date of Patent: Dec. 3, 1991

[54] FILTER APPARATUS

[75] Inventors: Hans F. Becker, Gensingen; Dieter Rudolf, Bad Kreuznach, both of Fed. Rep. of Germany

[73] Assignee: Seitz Enzinger Noll Maschinenbau Aktiengesellschaft, Mannheim, Fed. Rep. of Germany

[21] Appl. No.: 463,382

[22] Filed: Jan. 11, 1990

[30] Foreign Application Priority Data

Jan. 14, 1989 [DE] Fed. Rep. of Germany ....... 3900934

[51] Int. Cl.$^5$ .............................................. B01D 24/00
[52] U.S. Cl. .................................... 210/344; 210/224; 210/409
[58] Field of Search ............ 210/344, 347, 409, 510.1, 210/486, 224, 225, 230, 231

[56] References Cited

U.S. PATENT DOCUMENTS

| 984,704 | 2/1911 | Rarick | 210/409 |
| 3,206,034 | 9/1965 | Anderson | 210/347 |

FOREIGN PATENT DOCUMENTS 833395 4/1960 United Kingdom ................ 210/347

Primary Examiner—Bernard Nozick
Attorney, Agent, or Firm—Robert W. Becker & Associates

[57] ABSTRACT

A filter apparatus having a plurality of filter zones that are disposed one above the other and have associated therewith at least one common unfiltered fluid channel and at least one common filtrate channel. Each filter zone has at least one filter sheet, which is provided on a filter element, serves for the deposition of a cake layer formed from at least one filtering aid, and separates a filtrate collection area that opens into the filtrate channel from a filling space disposed above the filter sheet. Provided for each filter zone is an annular distribution space, which extends about the central axis of the filter, opens into the filling space at its outer periphery, and in the region of the central axis of the filter communicates with the unfiltered fluid channel. In order, while having a simplified structure, to achieve an optimum manner of operation, the unfiltered fluid channel is surrounded by the filter zones and is disposed in the vicinity of the central axis of the filter, where it opens directly into the distribution spaces via inlet openings.

27 Claims, 8 Drawing Sheets

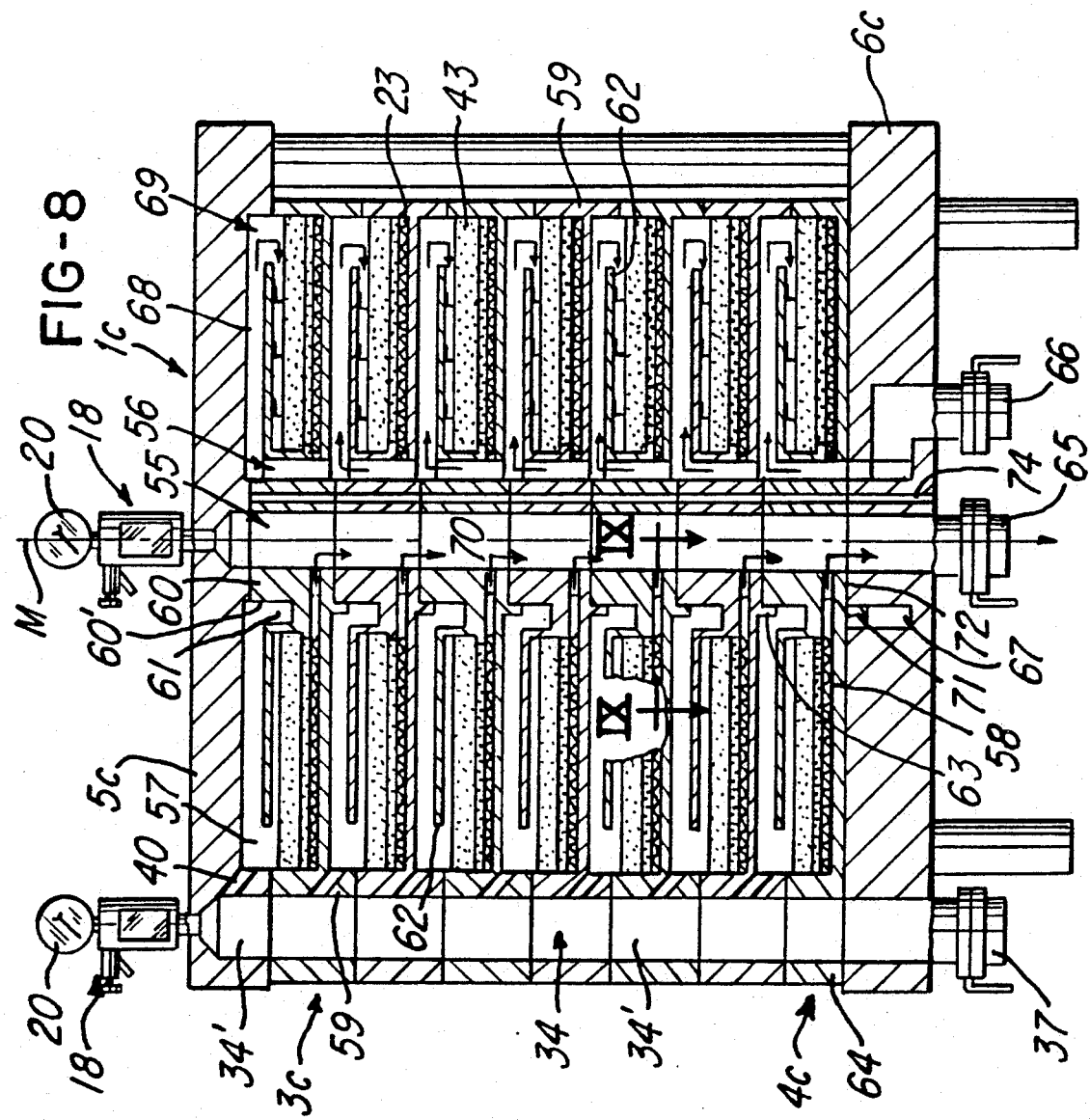

FILTER APPARATUS

BACKGROUND OF THE INVENTION

The present invention relates to a filter apparatus having a plurality of essentially horizontally disposed filter zones that are disposed one above the other in the direction of a vertical central axis of the apparatus, with at least one common unfiltered fluid channel for the supply of a fluid that is to be filtered (unfiltered fluid) as well as at least one common filtrate channel for withdrawing filtered fluid (filtrate) being associated with the filter zones, each of which has at least one filter sheet, which is provided on a filter element, serves for the deposition of at least one cake layer formed from at least one filtering aid, and separates a filtrate collection area that opens into the filtrate channel from a filter or filling space disposed above the filter sheet, with the apparatus also having a respective annular distribution space for each filter zone, each distribution space extending about the central axis, opening at its periphery at a greater first radial distance from the central axis into the filling space via discharge opening means, and, at a lesser, second radial distance from the central axis having at least one inlet opening means, for unfiltered fluid, that is in communication with the unfiltered fluid channel.

Pursuant to one known filter apparatus of this general type, which is in the form of a filter press (German Offenlegungsschrift 36 17 519), a respective distribution space as well as a filling space is provided between the horizontal filter elements and the filling structure. Each filling space is separated from the associated distribution space disposed thereabove by a wall or wall portion that is in the form of a guide plate, and communicates at the periphery of the guide plate with the filling space disposed therebelow via a slot-like opening that is formed there. In the region of the vertical central axis of the filter, each distribution space, at its upper boundary, which is formed by the underside of the respective filter element disposed thereabove, is provided with an inlet opening means that is disposed across from the center of the guide plate and that is connected to the unfiltered fluid channel via a connecting channel that is formed in this filter element, extends radially relative to the central axis of the filter, and extends over half of the diameter of the filter element, as a result of which it is very long; the unfiltered fluid channel is offset relative to the central axis of the filter and is disposed on the outer periphery of the filter elements. In a similar manner, with this known apparatus each filter element (with the exception of the uppermost filter element) is provided in the region of the central axis of the filter, and above the filter sheet, with a filtrate outlet that similarly communicates with a filtrate channel via a relatively long connecting channel that extends radially relative to the central axis of the filter; the filtrate channel is again radially offset relative to the central axis of the filter and is formed on the outer periphery of the filter elements. Due already to the aforementioned long connecting channels, this known filter apparatus is structurally relatively complicated. Another drawback of this known filter apparatus is that in view of the direction of flow of the unfiltered fluid that enters into the respective distribution space, which flow is in the direction of the central axis of the filter and extends downwardly from above, the guide plate that is provided below the inlet opening must have a relatively large diameter in order to prevent turbulence or washing away of the cake layer of filtering aids that is formed on the respective filter sheet. The slot-like opening, which is formed on the periphery of the guide plate and connects the distribution space with the filling space that is disposed therebelow, is therefore relatively small, so that a relatively high flow velocity results in the region of the slot-like opening for the unfiltered fluid that circulates about the guide plate. A further drawback of the heretofore known filter apparatus is that in order to clean the filter zones, i.e. in order to remove the filter residue, a separate channel is provided in which the filter residue that is loosened by a flushing agent, together with this flushing agent, are withdrawn via a respective slot-like outlet having a relatively small cross-sectional area. The removal of the filter residue requires a relatively long period of time and a large quantity of flushing agent. Due to the relatively small cross-sectional area of the slot-like outlet, there furthermore exists the danger that these slot-like outlets can easily become clogged, especially if during removal the filter residue is not completely dissolved in the flushing agent, but rather forms clumps or the like.

It is an object of the present invention to provide a filter apparatus of the aforementioned general type that, although it has a simplified construction, not only assures an optimum manner of operation, in particular also with a higher quantity throughput, but also enables a simplified and rapid cleaning.

BRIEF DESCRIPTION OF THE DRAWINGS

This object, and other objects and advantages of the present invention, will appear more clearly from the following specification in conjunction with the accompanying schematic drawings, in which:

FIG. 8 is a view similar to that of FIG. 1 showing a further exemplary embodiment of the inventive filter apparatus.

SUMMARY OF THE INVENTION

Figure 1:
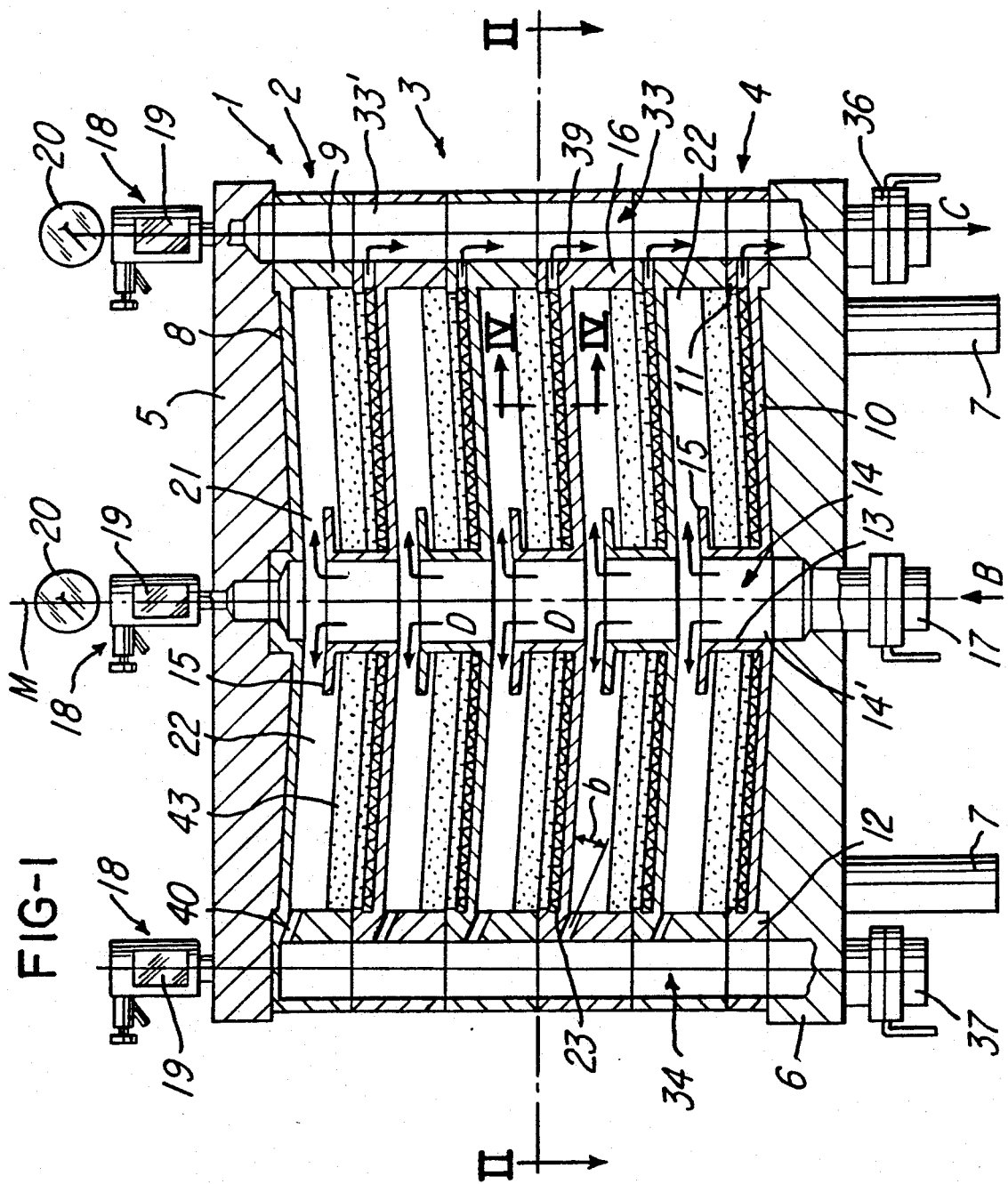
FIG. 1 is a longitudinal cross-sectional view through one exemplary embodiment of the inventive filter apparatus, and in particular is taken along the line I—I in FIG. 2.

The filter apparatus of the present invention is characterized primarily in that the unfiltered fluid channel is surrounded by the filter zones and is disposed in the vicinity of the central axis of the filter where it opens directly into the distribution spaces via the inlet opening means.

Since with the inventive filter apparatus the unfiltered fluid channel is provided in the vicinity of the central axis of the filter and is surrounded by the individual filter zones, and in addition the unfiltered fluid channel opens directly into the distribution spaces or chambers via the respective inlet opening means, it was possible to eliminate long connecting channels, which entail a complicated construction, into the filter elements between the unfiltered fluid channel and the inlet opening means, where the unfiltered fluid enters the distribution spaces.

Particularly favorable flow conditions result with the inventive filter apparatus due to the fact that the unfiltered fluid enters the distribution spaces in a direction of flow that is radial relative to the central axis of the filter; also during discharge from these distribution spaces, the direction of flow extends radially relative to the central axis of the filter. The inventive construction assures that without turbulence or washing away of the cake layers of filtering aids formed on the filter sheets, respective filter cakes, which have a uniform thickness as well as, above all, a uniform structure and composition, can build up at the individual filter zones from the filtered-out solid or turbid material (possibly in conjunction with the filtering aids added to the unfiltered fluid).

Pursuant to one preferred specific embodiment of the inventive filter apparatus, at least one discharge opening for a flushing agent, i.e. for a flushing liquid, is provided at each filter zone. These flushing agent outlet openings of all of the filter zones communicate with at least one common flushing channel. With this embodiment, at least two such flushing agent discharge openings are preferably provided for each filter zone, with a first one of these discharge openings having its axis oriented in such a way that the flushing agent stream that is discharged at this outlet opening not only loosens the filter residue formed from the respective filter cake and the cake layer from the pertaining filter sheet, but rather also effects a rotational movement of the flushing agent and the loosened or dissolved filter residue about the central axis of the filter, thus assuring a complete cleaning of the filter zones as well as a complete removal of the filter residue out of the filter apparatus. The axis of the second flushing agent outlet opening is then preferably disposed in a vertical plane that is disposed approximately radially relative to the central axis of the filter, so that via the flushing agent stream that is discharged from this second outlet opening, the more solid or clump-like constituents of the filter residue that may exist are divided or broken into pieces, so that these too can be removed in the flushing agent and can be transported away or discharged together with the flushing agent. The filter residue and the flushing agent are preferably withdrawn via the unfiltered fluid channel, which has a larger cross-sectional area, thus enabling cleaning of the filter zones to be accomplished in a relatively short period of time with a minimum of flushing agent. For a rapid and thorough cleaning, it is particularly advantageous if the filter elements or filter zones have a circular cross-sectional configuration, so that it is then possible at the filter zones to generate a rotating stream of flushing agent about the central axis of the filter.

Further specific features of the present invention will be described in detail subsequently.

DESCRIPTION OF PREFERRED EMBODIMENTS

Referring now to the drawings in detail, the embodiment of FIGS. 1-4 shows a filter apparatus 1 in the form of a filter press that is provided with a plurality of horizontal filter elements 2, 3, 4, each of which is embodied as a filling structure and has an annular peripheral configuration. The central axes of the filter elements 2-4 are coaxial with a vertical central filter axis M. The filter elements 2-4 are held between a fixed top cover 5 and a bottom, vertically movable cover 6 that, for pressing the filter elements 2-4 against one another to hold them together, cooperates with pressing mechanisms 7 that can be operated, for example, hydraulically.

The uppermost filter element 2, which is disposed directly below the cover 5, is provided with an essentially circular disk-shaped top wall 8, the upper surface of which rests flush against the underside of the cover 5, and which at the outer periphery of the filter element 2 merges into an annular peripheral wall 9 that concentrically surrounds the central axis of the filter and projects beyond the underside of the top wall 8. The lowermost filter element 4, which is disposed directly above the cover 6, is provided with an annular bottom wall 10, the underside of which rests flushly against the upper surface of the cover 6, and which on the outer periphery of the filter element 4 merges into an annular projection 11 that concentrically surrounds the central axis M of the filter and extends beyond the upper surface of the bottom wall 10, and also merges into an annular projection 12 that extends beyond the lower surface of the bottom wall 10 and also concentrically surrounds the central axis M of the filter. To adjust and fix the filter element 4 on the cover 6, the annular projection 12 extends into an annular recess provided in the cover 6.

In the vicinity of the central axis M of the filter, the bottom wall 10 merges into a circular cylindrical wall portion 13 that concentrically surrounds the central axis M of the filter and projects beyond the upper surface of the bottom wall. The wall portion 13 surrounds a channel portion 14' that is open toward the upper and lower sides of the filter element 4. The upper edge of the wall portion 13 is provided with a flange or wall portion 15 that is disposed essentially parallel to and at a distance from the bottom wall 10, and that relative to the central axis M of the filter projects radially outwardly from the wall portion 13. Starting from the wall portion 13, the wall portion 15 extends over a portion of the width of the annular portion of the filter element 4 and bottom wall 10 formed between the wall portion 13 and the projection 11. In the illustrated embodiment, the annular wall portion 15 has an outer diameter that is greater than the outer diameter of the wall portion 13, yet is considerably less than the outer diameter of the bottom wall 10 in the vicinity of the projection 11.

Each of the filter elements 3 that are disposed between the filter elements 2 and 4 have the same construction and differ from the filter element 4 merely in that the outer periphery of their bottom walls 10, rather than merging into the projection 12, merge into a peripheral wall 16 that projects beyond the underside of the bottom wall 10 and has a circular configuration in conformity with the peripheral wall 9. The peripheral wall 16 encircles the central axis M of the filter at the same radial spacing as do the peripheral wall 9 and the projections 11 and 12. The top wall 8 as well as the bottom walls 10 of the filter elements 2, 3 and 4 have a slightly conically disk-shaped configuration in such a way that the top wall 8 and the bottom walls 10 each extend upwardly at a slight angle in the direction from the central axis M of the filter to the outer periphery of the filter elements 2, 3, and 4. In principle, the top wall 8 as well as the bottom walls 10 could also be disposed in horizontal planes.

Where the filter elements 2 3, and are secured between the covers 5 and 6, the lower edge of the peripheral wall 9 of the filter element 2, and the lower edge of the peripheral wall 16 of each filter element 3, rest against the upper edge of the projection 11 of the filter element 3 or 4 disposed therebelow. The channel portions 14', which are coaxially disposed relative to one another as well as to the central axis M of the filter, form in the interior of the filter apparatus 1 a vertical unfiltered fluid channel 14 that serves for the supply of the fluid or liquid that is to be filtered (unfiltered fluid). The channel 14 leads through the cover 6 and is connected with an inlet means 17 that is provided at the underside of the cover 6. Through the cover 5, the unfiltered fluid channel 14, which is formed from the channel portions 14', is connected with a discharge valve mechanism 18, which is provided at the upper side of the cover 5 and includes a sight glass 19 and a pressure gauge 20.

Appropriate selection of the height of the peripheral walls 9 and 16 assures that when filter elements 2, 3, and 4 are secured between the covers 5 and 6, the wall portion 15 of the uppermost filter element 3 is disposed at a distance beneath the top wall 8, and similarly the wall portions 15 of the filter elements 3 and 4 disposed therebelow are each spaced below the bottom wall 10 of the filter element 3 disposed thereabove, so that an annular distribution space 21 is formed between each wall portion 15 and the top wall 8 or bottom wall 10 disposed thereabove for each filter element 2, 3, and 4. Relative to the central axis M of the filter, the distribution space 21 is open radially inwardly to the unfiltered fluid channel 14, and is open radially outwardly to a respective filter or filling space 22. The uppermost filling space 22 is formed between the top wall 8 and a filter sheet 23 that rests upon the upper side of the bottom wall 10 of the filter element 3 disposed therebelow. The rest of the filling spaces 22 are formed between the underside of a bottom wall 10 and the filter sheet 23 that is disposed on the upper side of a bottom wall 10 of a respective filter element 3 or disposed therebelow.

Figure 4:
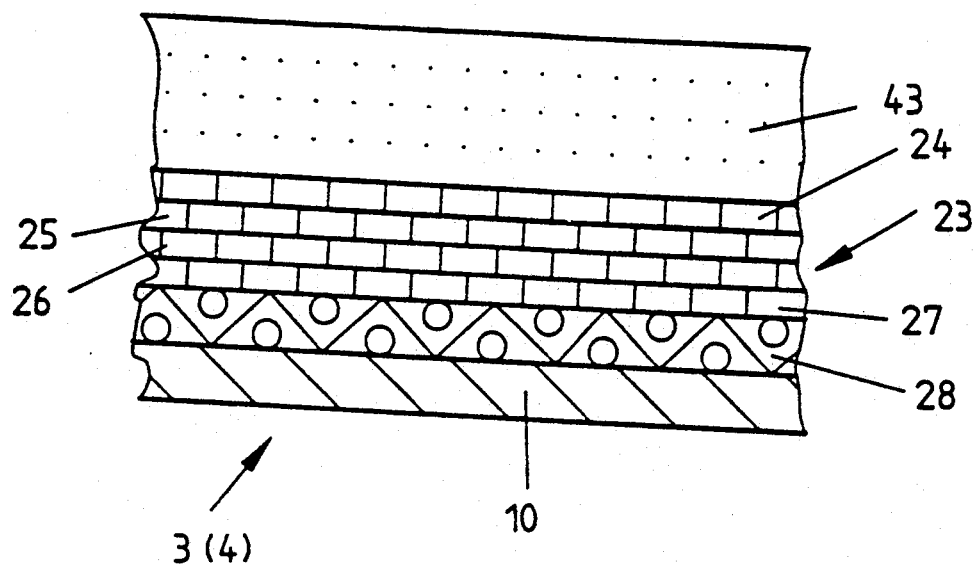
FIG. 4 is a cross-sectional view taken along the line IV—IV in FIG. 1.
Figure 7:
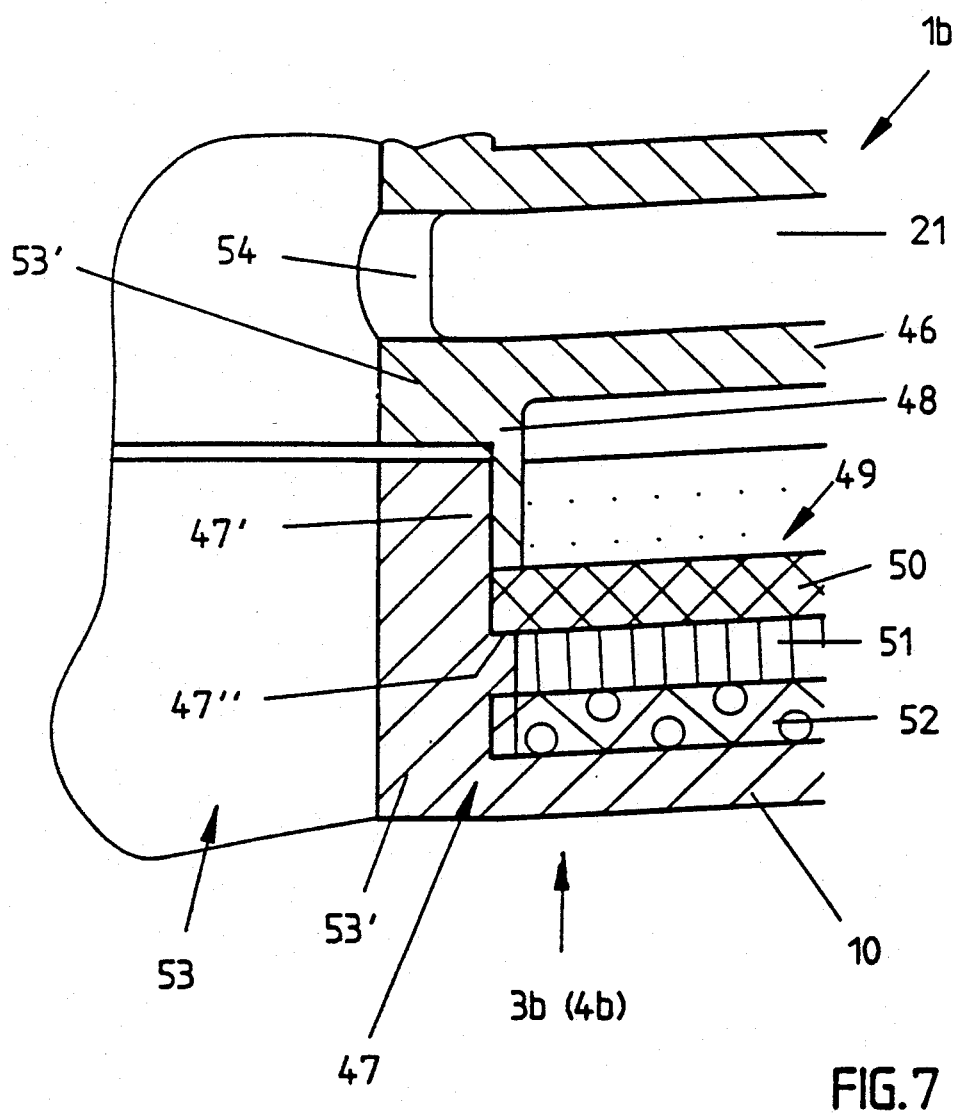
FIG. 7 is an enlarged vertical cross-sectional view of the apparatus of FIG. 6 showing one of the disk-like filter elements as well as a further disk provided above this filter element in the region of its inner edge, which extends about the vertical central axis of the filter, together with a filter mesh that is secured on its inner edge between the filter element and the additional disk.

The construction of the identically embodied filter sheets 23 is shown in FIG. 4. In the illustrated embodiment, each filter sheet 23 comprises several layers that are respectively formed of a mesh of corrosion-proof material, preferably stainless steel, and are connected to one another to form a mesh arrangement by sintering. Proceeding from the upper side facing the respective filling space 22, each filter sheet 23 comprises a protective mesh 24, a fine-meshed filter mesh 25 that is disposed below the protective mesh 24, a distributing mesh 26 that is provided below the filter mesh 25, and a support mesh 27, with the distributing mesh 26 having a coarser or wider mesh than the filter mesh 25, and with the support mesh 27 having a coarser mesh than the distributing mesh 26. The support mesh 27 rests upon the upper side of a drainage mesh 28, which in the illustrated embodiment is part of the mesh arrangement that is welded into the respective filter element 3 or 4. The underside of the drainage mesh 28, in turn, is supported on the upper side of the bottom wall 10 of this filter element 3 or 4. The drainage mesh 28, which especially in comparison to the support mesh 27 has a much coarser mesh, essentially serves to form, below the mesh arrangement formed by the protective mesh 24, the filter mesh 25, the distributing mesh 26, and the support mesh 27, a zone in which the filtered liquid or fluid (filtrate) can collect, and out of which this filtrate is withdrawn and which is designated as the filtrate collection zone. The drainage mesh 28 can also be replaced by other measures that assure an appropriate spacing between the bottom wall 10 and the support mesh 27. Thus, for example, it is possible, in place of the drainage mesh 28, to provide the upper side of the bottom wall 10 with, for example, knob or strip-like projections. In the illustrated embodiment, the protective mesh 24, the filter mesh 25, the distributing mesh 26, the support mesh 27, and preferably also the drainage mesh 28, are interconnected in a suitable manner and form a multi-layer mesh arrangement from which appropriately sized pieces of the filter sheets 23 (preferably including the drainage mesh 28) can be cut.

Figure 2:
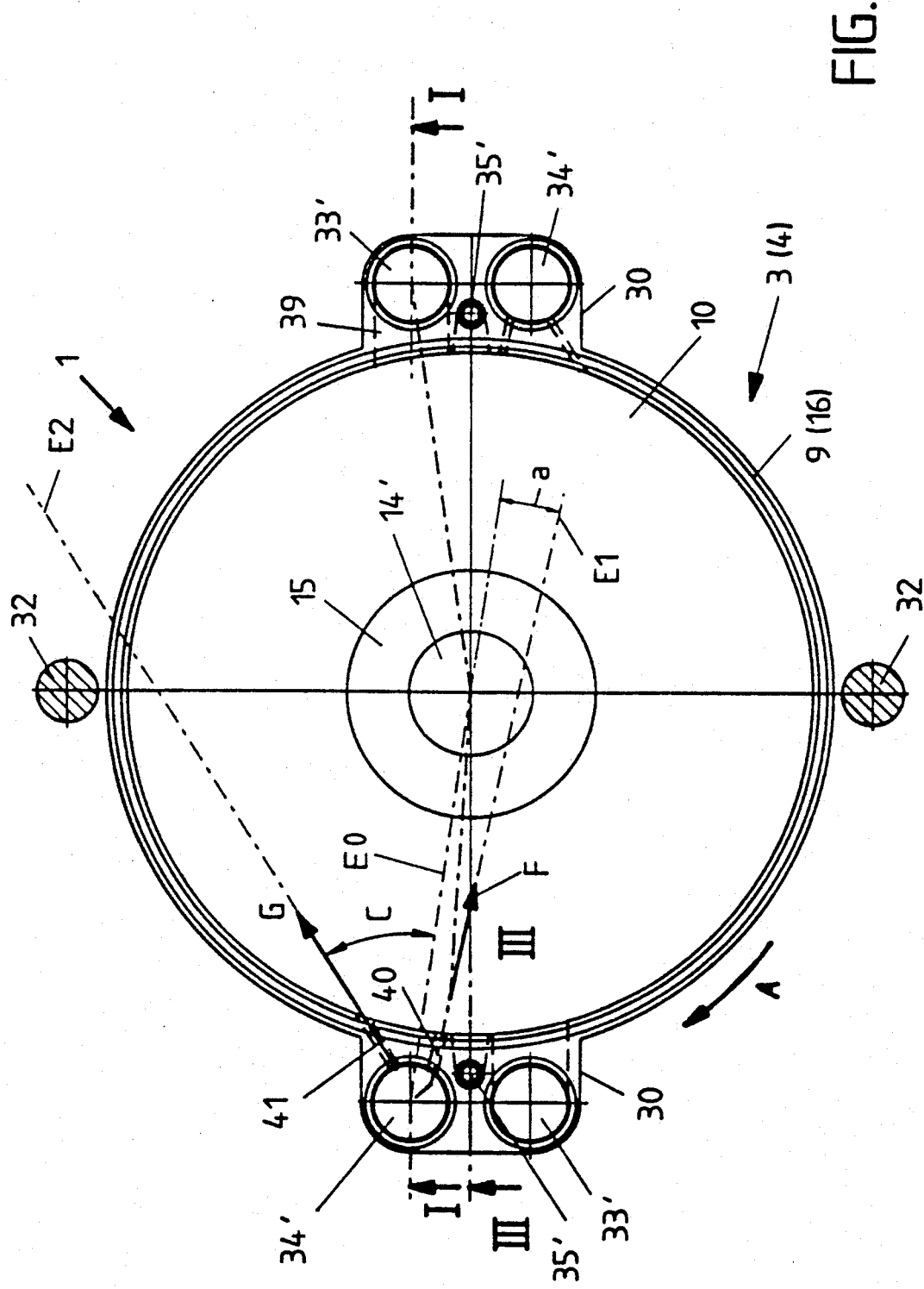
FIG. 2 is a horizontal cross-sectional view of the filter apparatus of FIG. 1 and is taken along the line II—II in FIG. 1.
Figure 3:
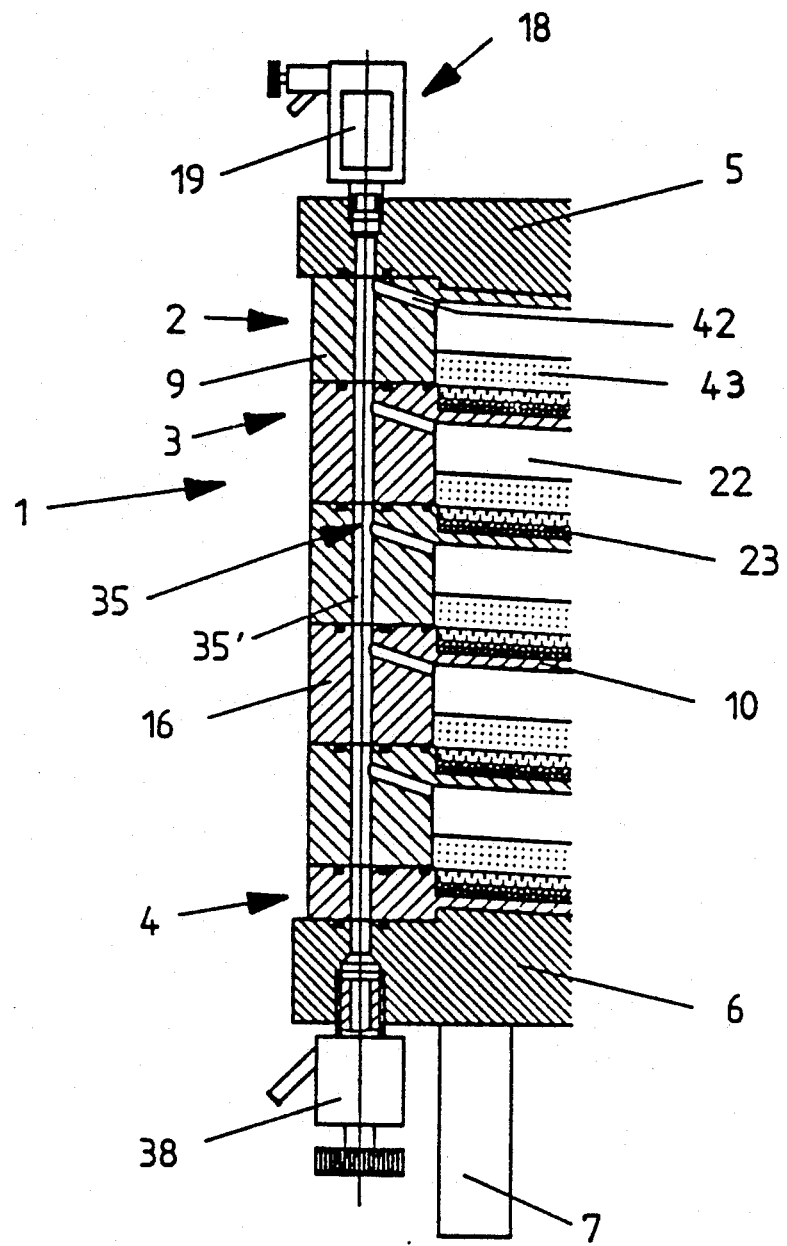
FIG. 3 is a cross-sectional view taken along the line III—III in FIG. 2.

As shown in particular in FIG. 2, the outer peripheries of the filter elements 2, 3, and 4, i.e. the outer surfaces of the peripheral walls 9 and 16 thereof, are integrally provided with projecting portions 30 that extend beyond these outer surfaces Each of the two projecting portions 30 is provided with three channel portions 33', 34', and 35' that have a circular cross-sectional configuration and that are open at both the upper side and lower side of these projecting portions of the filter elements 2, 3, and 4 The arrangement of the channel portions 33'-35' is such that in a given circumferential direction, for example the clockwise direction indicated by the arrow A in FIG. 2, at each projecting portion 30 the channel portion 34' follows the channel portion 33', with these channel portions 33' and 34' each having the same radial spacing from the central axis M of the filter, and, relative to the central axis M of the filter, each channel portion 33' at a given projecting portion 30 is disposed diametrically across from the corresponding channel portion 33' of the other projecting portion 30. The same applies to the channel portions 34' of the two projecting portions 30. The channel portions 33' and 34' have the same cross-sectional configuration. The channel portion 35' is provided between the channel portions 33' and 34' at each projecting portion 30 at a lesser radial distance from the central axis M of the filter. The channel portions 35' have a considerably smaller cross-sectional configuration than do the channel portions 33' and 34'. Relative to the central axis M of the filter, the channel portions 35' are also disposed diametrically across from one another.

When the filter elements 2, 3, and 4 are disposed between the covers 5 and 6, the channel portions 33', 34', and 35' of each filter element 2, 3, and 4 are respectively aligned with a corresponding channel portion 33', 34', and 35' of the other filter elements 2, 3, and 4, whereby the channel portions 33' of all of the filter elements form two filtrate channels 33 that extend parallel to the central axis M of the filter and serve for the withdrawal of the filtered fluid (filtrate): the filtrate channels 33 also continue through the bottom cover 6 to respective outlet means 36 for the filtrate. In a similar manner, the channel portions 34' form two rinsing or flushing channels 34 that are offset relative to one another by 180° relative to the central axis M of the filter, are disposed parallel to this axis M, and serve for cleaning the filter elements 2, 3, and 4, i.e. the filling spaces 22; the flushing channels 34 continue through the bottom cover 6 to an inlet means 37 that is provided on the underside of this cover for a rinsing or flushing agent (flushing liquid). The filtrate channels 33 as well as the flushing channels 34 also extend through the top cover 5, where a discharge valve mechanism 18 with a sight glass 19 and a pressure gauge 20 is similarly provided on the filtrate channels 33, while a discharge valve mechanism 18 with a sight glass 19, but without the pressure gauge 20, is connected to the flushing channels 34. The channel portions 35' form two venting channels 35 that are offset from one another by 180° and extend parallel to the central axis M of the filter. The venting channels 35 extend through the covers 5 and 6, and are provided on the underside of the cover 6 with a valve 38, and on the upper side of the cover 5 with a discharge valve mechanism 18. It is to be understood that when filter elements 2, 3, and 4 are disposed between the covers 5 and 6, the periphery of these filter elements, as well as the region of their projecting portions 30, sealingly adjoin one another via the use of sealing elements or rings in such a way that not only the interior of the filter apparatus 1 formed by the filter elements 2, 3, and 4, but also the unfiltered fluid channel 14, the filtrate channels 33, the flushing channels 34, and the venting channels 35 are sealed off relative to the atmosphere.

Each filter element 3 and 4 is provided in the projection 11 with two slot-shaped openings 39, each of which opens into one of the channel portions 33' as well as, at the inner surface of the projection 11, directly over the upper side of the bottom wall 10, into the filtrate collection zone that is formed by the drainage mesh 28 below the support mesh 27.

Each filter element 2 and 3 is furthermore provided, at the inner surface of the peripheral wall 9 or 16, directly below the top wall 8 or bottom wall 10, with two pairs of in each case two discharge openings for a flushing agent. In the illustrated embodiment, these discharge openings are respectively formed by a passage 40 or 41, whereby one end of each passage 40 and 41 is open at the inner surface of the peripheral wall 9 or 16, with its other end opening into the pertaining channel portion 34' and hence into one of the two flushing channels 34. As shown in FIGS. 1 and 2, all of the passages 40 of all of the filter elements 2 and 3 that open into a given flushing channel 34 have their longitudinal extensions disposed in a common vertical plane E1 that, with a vertical reference plane E0 in which is disposed the central axis M of the filter and which intersects the plane E1 along the axis of the pertaining flushing channel 34, forms an angle "a" such that in the aforementioned clockwise direction of the arrow A about the central axis M of the filter, the plane E1 follows the reference plane E1. The passages 40 are furthermore inclined relative to the horizontal in such a way that the longitudinal extension of each channel 40 forms with the top wall 8 or bottom wall 10 disposed thereabove an acute angle "b" that is open in the direction toward the central axis M of the filter. In the illustrated embodiment, the angle "a" is only a few degrees.

Starting from the respective channel portion 34', the passages 41, similar to the passages 40, also extend downwardly at an angle. Those passages 41 of all of the filter elements 2 and 3 that are provided at a given flushing channel 34 have their axes disposed in a common vertical plane E2 that forms an acute angle "c" with the reference plane E0. The angle "c" is considerably greater than the angle "a", but is also considerably less than 90° and is, for example, of an order of magnitude of 45°. The angle "c" of the passages 41 of both of the flushing channels 34 opens in the same circumferential direction, i.e. in the direction of the arrow A. However, it should be noted that for the flushing function, which will be described further subsequently, it is not absolutely necessary that the passages 40 and 41 be directed as described above. Rather, it is merely necessary that the discharge openings that are provided on the inner surfaces of the peripheral wall 9 or 16 for the flushing agent, and that can be formed, for example, from nozzle openings of nozzles that have been screwed or otherwise placed in, produce streams of flushing medium that are oriented in conformity with the described position of the axes of the holes 40 and 41.

In the vicinity of the peripheral wall 9 or 16, each filter element 2 and 3 is additionally provided with two further passages 42, each of which has one end open at the inner surface of the peripheral wall 9 or 16 directly below the top wall 8 or the bottom wall 10, with the other end opening into one of the channel portions 35'. These passages 42, which connect the filling spaces 22 with the venting channels 35, are also inclined slightly downwardly relative to the horizontal similar to the passages 40 and 41.

To start a filtration process, in a customary manner in a deposition phase, using at least one filtering aid, a cake layer 43 formed by this filtering aid is first built up to the required thickness on the upper surface of the filter sheets 23. After the conclusion of this deposition phase or precaking, there is in then effected, again in a customary manner, the filtration, pursuant to which the fluid that is to be filtered is supplied in the direction of the arrow B via the inlet means 17, and the filtrate is withdrawn in the direction of the arrow C via the two outlet means 36, which are provided below the cover 6 and are preferably connected to one another. In so doing, the unfiltered fluid passes via the inlet means 17, the unfiltered fluid channel 14 and the distribution spaces 21 into the individual filling spaces 22, in which the fluid then flows through the cake layer 43 and the filter sheet 23 accompanied by separation or extraction of the turbid or solid materials onto or in the cake layer 43, so that the filtrate can flow off into the filtrate channels 33 via the respective filtrate collecting zone, which is formed by the drainage mesh 28, and via the openings 39.

As indicated by the arrows D in FIG. 1, as the unfiltered fluid enters the distribution spaces 21 from the channel 14, the unfiltered fluid is deflected by 90° such that the direction of flow of this unfiltered fluid after entering each distribution space 21 is directed radially outwardly relative to the central axis M of the filter. Since due to the annular configuration of the distribution spaces 21, the effective cross section thereof increases as the distance from the central axis M of the filter increases, there is achieved within the distribution spaces 21 an increasing deceleration of the flow velocity of the unfiltered fluid, so that even where a relatively high quantity of unfiltered fluid is supplied to the inlet means 17 per unit of time, when the unfiltered fluid leaves the respective distribution spaces 21 it enters the pertaining filter or filling space 22 at only a very low flow velocity, and in particular with a defined flow component that is directed radially away from the central axis M Of the filter. Since the unfiltered fluid enters the pertaining filling space 22 from the respective distribution space 21 at a greatly reduced flow velocity, this entry region, due to the wall portions 13 and 15, is disposed at a distance above the respective filter sheet 23 and the cake layer 43 disposed thereon, i.e. the filter sheet 23 and the cake layer 43 are, so to speak, disposed in the "flow shadow" of at least the radial flow components of the unfiltered fluid that enters the filling space 22, with this unfiltered fluid not entering the cake layer 43 until the flow velocity is first reduced and a further downward deflection of about 90° is effected, there is assured that even at a relatively high quantity throughput (quantity of unfiltered fluid supplied per unit of time) a cake layer 43 of uniform structure and composition that is suitable for deep bed filtration will be deposited on the filter sheet 23, and that this cake layer 43 will be maintained during the actual filtration and will not be lost or become unusable due to churning up or washing away in certain areas of the filter sheet 23. This is also assured if during a conventional precaking, a cake layer 43 is deposited and during the actual filtration the turbid and solid materials, together with the filtering aids that are added to the unfiltered fluid during the filtration, are deposited thereon. The important thing for the above described manner of operation of the filter apparatus 1, and for the advantages connected therewith, is also that the unfiltered fluid, which is supplied via the inlet means 17 to the unfiltered fluid channel 14 from below, upon discharge from the respective distribution spaces 21 and also thereafter in the respective filling space 22, initially have a direction of flow that extends radially relative to the central axis M of the filter.

After conclusion of the filtration, the filter apparatus can be easily cleaned without difficulty via a suitable flushing means. For this purpose, flushing agent is supplied at a suitable pressure via the inlet means 37 to the two flushing channels 34, so that the flushing medium, as indicated by the arrows F an G in FIG. 2, then enters the filling spaces 22 as streams of flushing fluid at the discharge openings that are in communication with the flushing channels 34 and which in the illustrated embodiment are formed by the passages 40 and 41. By means of the flushing medium that is discharged out of the passages 41 or the appropriate discharge openings in the direction of the arrow G, the loosened constituents of the cake layer 43 (filter residue) or of the filter cake within the respective filling space 22, are rotated in the direction of the arrow A, while at the same time the flushing fluid that is discharged from the passages 40 or the appropriate discharge openings in the direction of the arrow F produces a flushing medium stream or counter stream that is directed essentially radially inwardly and that reduces t he size of possibly larger constituents or clumps of the loosened filter residue and hence ensures a complete break-up of this filter residue, which can then, together with the flushing medium, be discharged via the channel 14 and the inlet means 17.

Figure 5:
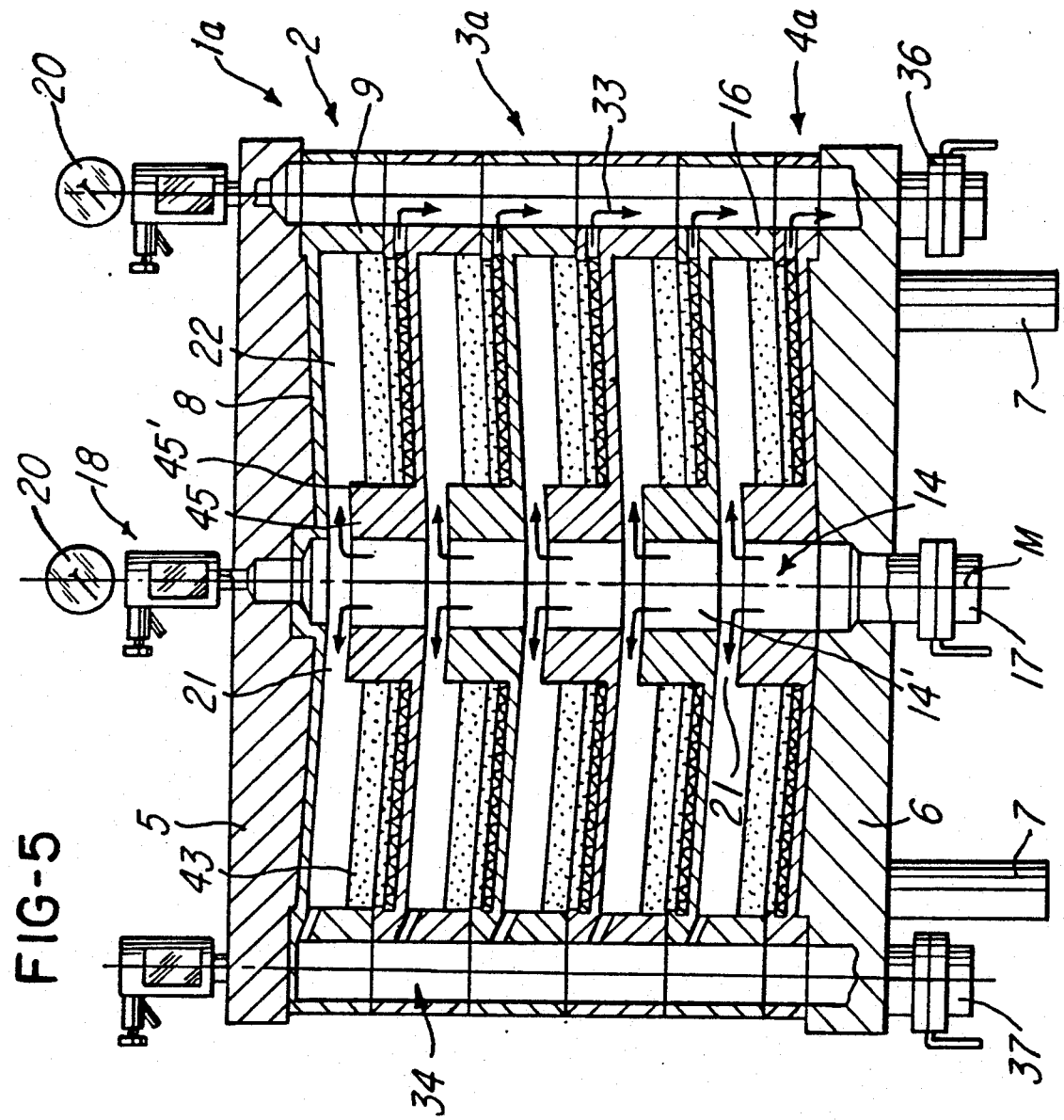
FIGS. 5 and 6 are cross-sectional views similar to that of FIG. 1 showing two further exemplary embodiments of the inventive filter apparatus.

The filter apparatus 1a illustrated in FIG. 5 differs from the filter apparatus 1 essentially only in that the filter elements 3a and 4a, which are used together with the filter element 2, and which correspond in arrangement, function, and the rest of their design to the filter elements 3 and 4, are provided in place of the wall portions 13 and 15 with a ring 45 that extends concentrically about the central axis M of the filter and is connected to or integral with the respective bottom wall 10; the outer diameter of the ring 45 is approximately equal to the outer diameter of the wall portions 15 of the filter elements 3 and 4 of the filter apparatus 1. The inner surface of each ring 5 again forms a channel portion 14′, while the upper ring surface 45′ forms the annular distribution space 21 in conjunction with the underside of the top wall 8 of the filter element 2 or the bottom wall 10 of the filter element 3a disposed above the surface 45′.

Figure 6:
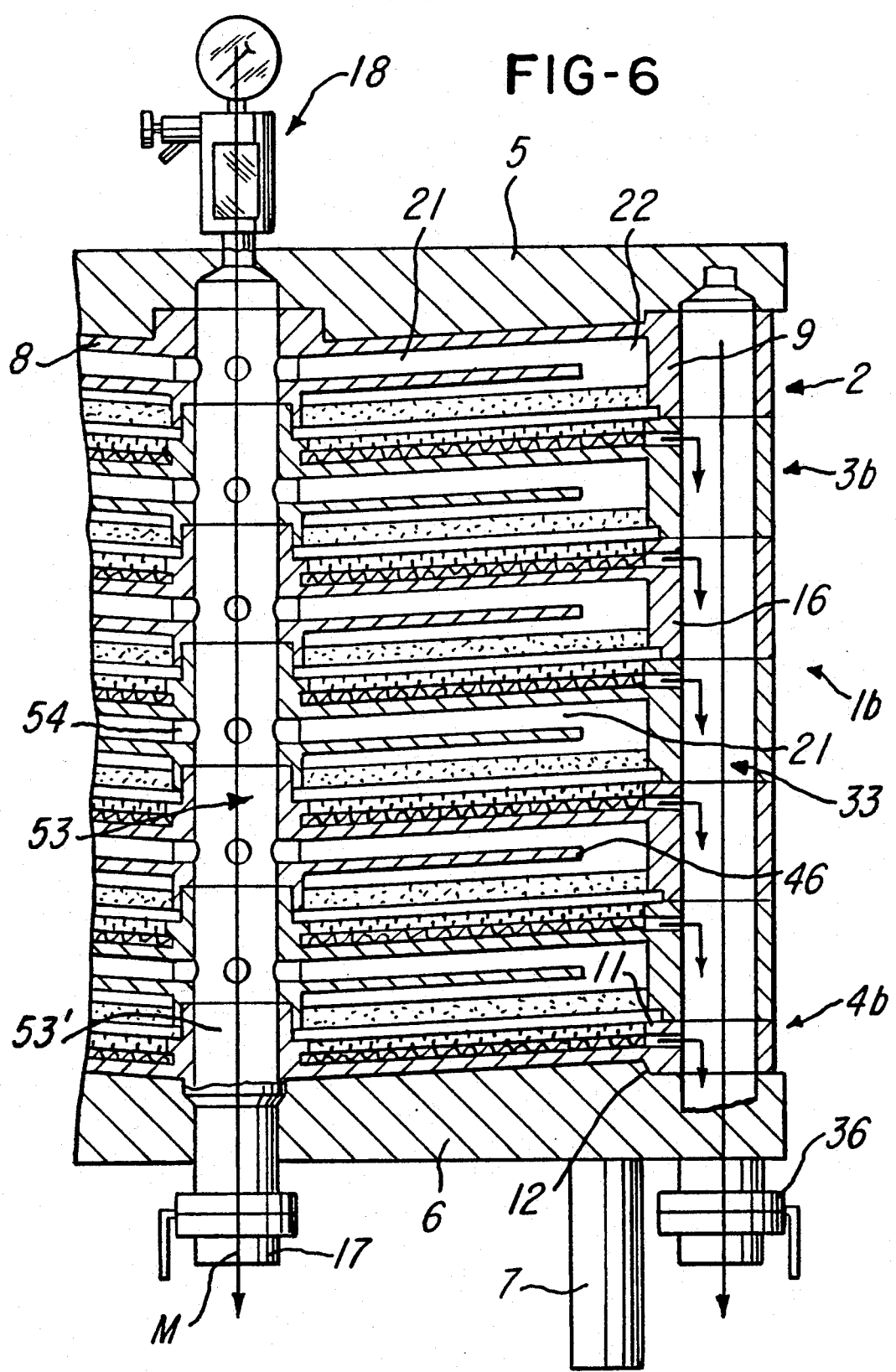

FIG. 6 shows a filter apparatus 1b that essentially differs from the filter apparatus 1 in that instead of the filter elements 3 and 4, filter elements 3b and 4b are used in conjunction with the filter element 2 that correspond in arrangement and function to the filter elements 3 and 4 of the filter apparatus 1. However, with the filter apparatus 1b each of the filter elements 3b and 4b has two parts, i.e. they each comprise an upper additional disk 46 and a lower, disk-like part that forms the bottom wall 10 of the respective filter element 3b or 4b and on the outer periphery again has the annular projection 11, which adjoins the bottom wall 10 and projects beyond the upper surface thereof, and also has the peripheral wall 16 (for the filter elements 3b) that projects beyond the underside of the bottom wall 10 or has the projection 12 (for the filter element 4b) that projects beyond the underside of the bottom was 10.

On the inner region that surrounds the central axis M of the filter, each filter element 3b or 4b is provided with a circular cylindrical flange 47 that projects beyond the upper side of the bottom wall 10. The additional disk 46 is detachably secured to the flange 47 in such a way that an annular flange 48 of the disk 46 that projects beyond the underside thereof extends around a reduced outer diameter portion 47′ of the flange 47. In the filter apparatus 1b, the filter sheet 49, which corresponds to the filter sheet 23, is formed from an upper layer comprised of a carrier layer that is customary for the cake layer 43, a filter membrane, or a filter mesh 50 that at the inner edge of the filter elements 3b and 4b is tightly secured between the flange 48 and a shoulder 47″ of the flange 47, and on the outer edge of the filter elements 3b and 4b is tightly secured between the annular projection 11 of the respective filter element and the peripheral wall 9 or 16 of the respective filter element 2 or 3b that is disposed thereabove. The filter mesh 50 is disposed upon a support mesh 51, which in turn rests upon a drainage mesh 52 that is supported against the upper side of the bottom wall 10.

In the filter apparatus 1b, the disks 46, as well as the filter elements 2, 3b, 4b, extend about a tubular element 53′ that is disposed coaxially relative to the central axis M of the filter; the tubular element 53′ forms the unfiltered fluid channel 53 that is connected with the inlet means 17, and also extends in the covers 5 and 6. The tubular piece 53′ is preferably formed from several tubular portions that rest tightly against one another and that are secured either to the disks 46 or to the filter elements 2, 3b, 4b, whereby such a tubular element portion is also provided at the cover 6 and the cover 5. The tubular element 53′ is provided with a plurality of openings 54, a number of which respectively open into each distribution space 21, which is formed between the upper side of a disk 46 and the top wall 8 or bottom wall 10 that is disposed thereabove. The filter apparatus 1b corresponds to the filter apparatus 1 with regard to the filtrate channels 33, the flushing channels 34, and the venting channels 35, as well as the elements associated therewith. This also applies to the function and effect of the distribution spaces 21, in which connection, due to the disks 46 that can be removed from the filter elements 3b and 4b, and due to the possibility provided thereby for a better accessibility to the upper side of the bottom walls 10 of these filter elements, for example for the installation of the filter sheet 49, it is possible for the disks 46 to have an outer diameter that is greater than the outer diameter of the wall portions 15 or the rings 45 of the filter apparatus 1 and 1a, thereby improving the effect of the distribution spaces 21 considerably further. In contrast to the filter apparatus 1, the filter apparatus 1a and 1b also have the additional fundamental advantage that the respective filter sheet 23 or 49, or the layers that form these filter sheets, can each be placed upon the bottom wall 10 as an integral arrangement.

Figure 9:
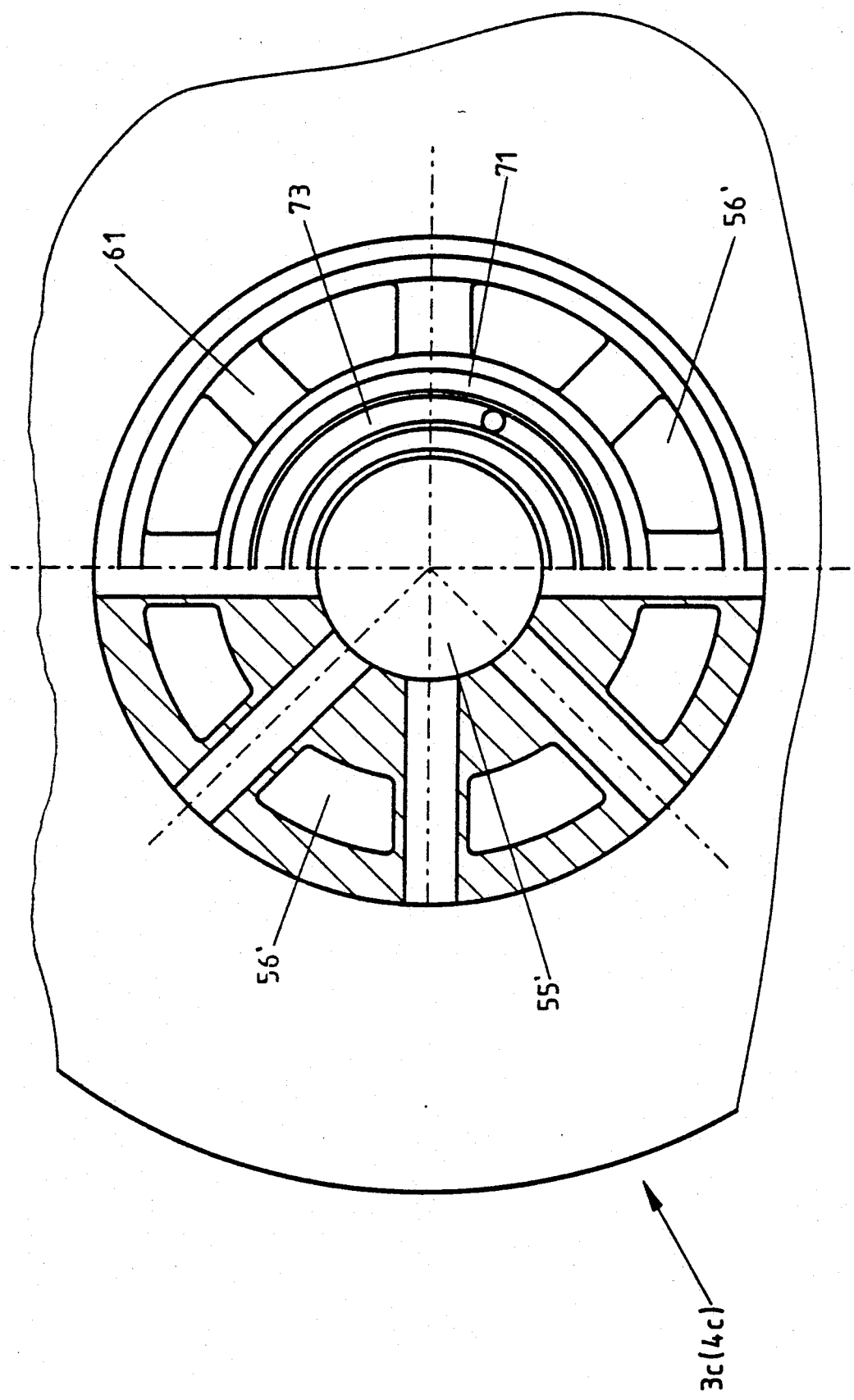
FIG. 9 is a partially cross-sectioned view taken along the line IX—IX in FIG. 8, and a partial plan view, of one of the filter elements of the filter apparatus of FIG. 8.

FIGS. 8 and 9 show a filter apparatus 1c that is again embodied as a filter press and comprises the filling structure or filter elements 3c and 4c that are disposed between the covers 5c and 6c.

The filter apparatus 1c differs from the filter apparatus 1 essentially in that the filtrate channel 55 in the center of the filter apparatus 1c is disposed coaxially relative to the central axis M of the filter, and in that a plurality of unfiltered fluid channels 56 that extend parallel to the central axis M of the filter are distributed about the filtrate channel 55 and are in turn surrounded by the filling structure. Also with this embodiment, the flushing channels 34 as well as the non-illustrated venting channels 35 are again provided on the outer side of the filter elements 3c and 4c.

The uppermost filter element 3c, which directly adjoins the underside of the cover 5c, which at this underside is provided with a circular recessed portion 57 that extends around the central axis M of the filter, comprises, as do the further filter elements 3c that are disposed therebelow, a circular, disk-shaped bottom wall 58 that is disposed in a horizontal plane. On the outer side of the filter element 3c, the bottom wall 58 merges into a circular peripheral wall 59 that extends concentrically about the central axis M of the filter and that projects beyond both the upper side as well as the underside of the bottom wall 58. In the central portion of each filter element 3c, the bottom wall 58 merges into a ring 60 that projects beyond the upper side of this bottom wall 58 and is provided with a channel portion 55' (FIG. 9) that is open toward the upper side and the underside of the filter element 3c. Furthermore, the upper side of each ring 60 is provided with an annular groove 61 that extends concentrically about the central axis M of the filter and is open toward the top. A portion 60' of the ring with a reduced cross-sectional configuration projects beyond that edge of the groove 61 that is disposed closest to the central axis M of the filter, and a flange or wall portion 62 that extends radially outwardly away from the ring 60 is provided on the ring at that edge of the groove 61 that is disposed the furthest from the central axis M of the filter; the wall portion 62 is provided parallel to, and at a distance above, the bottom wall 58 of the pertaining filter element 3c. The outer diameter of each disk-shaped wall portion 62 is less than the diameter of the pertaining filter element 3c at the inner surface of the peripheral wall 59. Distributed in the ring 60 of each filter element 3c about the central axis M of the filter are channel portions 56', each of which is open on the underside of the filter element 3c and opens into the groove 61 on the upper side of the filter element 3c. In the region of the ring 60, the underside of each filter element 3c is furthermore provided with an annular flange 63 that extends about the ring portion 60' of the respective filter element 3c or 4c disposed therebelow. The flange 63 can also be respectively interrupted in the region of the channel portions 56'. The filter element 4c differs from the filter elements 3c merely in that on the filter element 4c, that portion of the peripheral wall 59 that projects beyond the underside of the bottom wall 58 is eliminated, so that the underside of the bottom wall 58 of the filter element 4c rests flushly against the upper side of the cover 6c.

On the peripheral wall 59, the filter elements 3c and 4c are again provided with projecting portions 64, similar to the projecting portions 30, that include the channel portions 34'.

When filter elements 3c and 4c are disposed between the covers 5c and 6c, the channel portions 34', 55', and 56' of the individual elements 3c and 4c are aligned with one another, so that the channel portions 34' form the continuous flushing channel 34, the channel portions 55' form the continuous filtrate channel 55, and the channel portions 56' form a number of continuous unfiltered fluid channels 56, with a total of eight such unfiltered fluid channels being distributed about the filtrate channel 55 in the illustrated embodiment. With this embodiment also, the passages 40 and 41, with only the passages 40 being illustrated in FIG. 8, again open into the flushing channel 34, which here also is provided with the inlet means 37 under the cover 6c and which is connected with the discharge valve mechanism 18 with the pressure gauge 20 that are provided on the upper side of the cover 5c. The passages 40 and 41 are also provided in the cover 5c, where they open on the one hand into the recessed portion 57 and on the other hand into the channel portion 34' that is also formed in the cover 5c.

An outlet means 65 is provided on the underside of the cover 6c for the filtrate channel 55. At its upper end, the filtrate channel 55 is connected to a discharge valve mechanism 18 having a pressure gauge 20. Also provided on the underside of the cover 6c is an inlet means 66 that communicates with a groove-like annular channel 67 that is formed in the cover 6c and is open toward the upper side of this cover; the annular channel 67, in turn, establishes communication to the individual unfiltered fluid channels 56.

An annular distribution space or chamber 68 is formed between the wall portion 62 of each filter element 3c or 4c and the boundary wall disposed thereabove, which for the uppermost filter element is formed by the base of the recessed portion 57 in the cover 5c, and which for the filter elements disposed therebelow is respectively formed by the underside of the bottom wall 58 of the filter element 3c disposed thereabove; the function and effect of the distribution space 68 correspond to those of the distribution space 21. In addition, an annular filter or filling space 69 is again formed in each filter element 3c or 4c, and in particular essentially below the respective wall portion 62 and above the filter sheet 23 that is supported on the upper side of the respective bottom wall 58. In order to withdraw into the filtrate channel 55 the filtrate that collects below the filter sheet 23, i.e. in the filtrate collection region of thedrainage mesh holes or passages 70 that extend essentially radially relative to the central axis M of the filter are provided in a region of the ring 60 of each filter element 3c or 4c and are offset relative to the channel portions 56'; one end of each passage 70 opens into the filtrate collection region formed by the drainage mesh, and the other end opens into the filtrate channel 55.

The individual filter elements 3c and 4c are again disposed tightly against one another and also against the covers 5c and 6c in the region of their peripheral walls 59, in the region of their rings 60, and hence on the region of their projections 64, via the use of sealing rings. In the illustrated embodiment, two concentric sealing rings 71 and 72 are respectively provided on the rings 60 at the connection or transition areas between the individual filter elements 3c and 4c, as well as at the transitions between the filter element 3c and the cover 5c and between the filter element 4c and the cover 6c; disposed between the two sealing rings 71 and 72 is a groove 73 that extends concentrically about the central axis M of the filter and opens into a drainage channel 74 that extends parallel to the central axis M of the filter, so that despite the close spacial arrangement between the unfiltered fluid channels 56 and the filtrate channel 55, if either of the sealing rings 71 or 72 ever goes bad, unfiltered fluid cannot pass directly into the filtrate channel 55, but rather flows off via the drainage channel 74, which is open on the underside of the cover 6c.

The filter apparatus 1c, with a relatively straightforward structural configuration, also offers the same advantages as previously described in conjunction with the filter apparatus 1 with regard to reducing the flow velocity of the unfiltered fluid into the distribution spaces 68 as well as with regard to the cleaning or discharge of the filter residue.

The present invention is, of course, in no way restricted to the specific disclosure of the specification and drawings, but also encompasses any modifications within the scope of the appended claims.

What we claim is:

1. A filter apparatus comprising:
   a plurality of essentially horizontally disposed filter chambers which are formed by filter elements and which are disposed one above the other in the direction of a vertical central axis of said apparatus, with said filter chambers each being defined by wall means of said filter elements and being separated from one another by said wall means, with said wall means including a bottom wall and a peripheral outer wall;
   at least one common unfiltered fluid inlet channel for the supply of a fluid that is to be filtered, said fluid inlet channel communicating with said filter chambers and being formed by channel sections disposed one above the other, with each of said channel sections being connected to a respective one of said bottom walls of said filter chambers;
   at least one common filtrate outlet channel for withdrawing filtered fluid that is in communication with said filter chambers via said filter elements;
   said filter elements comprising at least said bottom wall, said peripheral outer wall, a drainage means and a filter sheet, with said peripheral outer walls of said filter elements disposed above one another forming an outer peripheral casing of said apparatus;
   said filter sheets of said respective filter elements of one of said filter chambers serving as an upper deposition surface for depositing at least one cake layer formed from at least one filtering aid, and separating said filter chamber into a filtrate collection area and into a filling space, with said filtrate collection area being arranged below said upper deposition surface and opening into said filtrate outlet channel, and with said filling space being disposed above said upper deposition surface of said filter sheets;
   a respective annular distribution space for each of said filter chambers, with each of said distribution spaces extending about said central filter axis, opening at its periphery at a greater first radial distance from said central axis into a respective one of said filter chambers via discharge opening means, with, at a lesser second radial distance from said central axis, each of said distribution spaces having at least one inlet opening means that is in communication with said unfiltered fluid inlet channel; and
   said unfiltered fluid channel being surrounded by said filter chambers and being disposed in the vicinity of said central filter axis, where it opens directly into said distribution spaces via said inlet opening means.

2. A filter apparatus according to claim 1, in which said filter elements at least have an inner portion with a circular cross-sectional configuration.

3. A filter apparatus according to claim 1, in which each of said discharge opening means is, in the direction of said vertical central filter axis, spaced above each of said filter sheets of said respective filter chamber.

4. A filter apparatus according to claim 1, which is embodied as a filter press comprising a top cover and a bottom cover between which are disposed said filter elements, as horizontal filling and filter structures, with one of said filling spaces being formed between an underside of said top cover and one of said filter elements being disposed therebelow and with remaining ones of said filling spaces being formed between each two successive ones of said filter elements, as viewed in the direction of said central filter axis, with said filling spaces being limited in an outward direction by said peripheral outer wall of said filter elements.

5. A filter apparatus according to claim 1, in which each of said distribution spaces and said discharge opening means thereof are, in the direction of said vertical central filter axis, spaced above said filter sheet of said respective filter chamber.

6. A filter apparatus according to claim 1, in which said bottom wall extends essentially horizontally and surrounds said central filter axis, with said respective filter sheets being disposed on said bottom wall; and in which each of said filter elements, at a distance above said bottom wall, has a first delimiting surface means that extends concentrically about said central filter axis, with said distribution space being formed between said first delimiting surface means and a second delimiting surface means that is disposed thereabove.

7. A filter apparatus according to claim 6, in which, for an uppermost one of said distribution spaces, said second delimiting surface means is formed by an underside of a top cover of said housing; and in which, for remaining distribution spaces, each of said second delimiting surface means is formed by an underside of said bottom wall of said filter element disposed thereabove.

8. A filter apparatus according to claim 6, in which for an uppermost one of said distribution spaces, said second delimiting surface means is formed by an underside of a top wall of a filter element disposed thereabove; and in which for remaining distribution spaces, each of said second delimiting surfaces means is formed by an underside of said bottom wall of said filter element disposed thereabove.

9. A filter apparatus according to claim 8, in which said first delimiting surface means is formed by an end face of a ring projection that concentrically surrounds said central filter axis and projects beyond an upper surface of said bottom wall of said filter element.

10. A filter apparatus according to claim 8, in which said first delimiting surface means is formed by an upper surface of an annular wall portion that, relative to said central filter axis, extends radially outwardly from a ring projection that concentrically surrounds said central axis and projects beyond an upper surface of said bottom wall of said filter element.

11. A filter apparatus according to claim 10, in which said wall portion that forms said first delimiting surface means for a respective distribution space extends, in a direction from said central filter axis, to an outer edge of said filter elements over a portion of the width of said bottom wall that is disposed therebelow.

12. A filter apparatus according to claim 10, in which the outer diameter of said radially extending wall portion that forms said first delimiting surface means for a respective distribution space is less than the outer diameter of a circular bottom wall disposed therebelow.

13. A filter apparatus according to claim 1, in which said unfiltered fluid inlet channel is disposed coaxial to said central filter axis.

14. A filter apparatus according to claim 13, in which to form said inlet opening means for establishing said communication between said distribution spaces and said unfiltered fluid inlet channel, that portion of an uppermost one of said filter elements that surrounds said central filter axis and said unfiltered fluid inlet channel is spaced from an underside of a top cover of said housing.

15. A filter apparatus according to claim 13, in which, to form said inlet opening means for establishing said communication between said distribution spaces and said unfiltered fluid inlet channel, that portion of each of said filter elements that surrounds said central filter axis and said unfiltered fluid inlet channel is spaced from the filter element disposed thereabove.

16. A filter apparatus according to claim 13, in which said at least one filtrate outlet channel is radially offset relative to said central filter axis and is provided on an outer peripheral surface of said filter elements.

17. A filter apparatus according to claim 1, which includes at least one vertical flushing channel, which is common to all of said filter chambers and communicates with at least one flushing medium discharge opening at each of said filter chambers.

18. A filter apparatus according to claim 17, in which said flushing medium discharge openings for each one of said filter chambers are disposed above said respective filter sheet of each respective one of said filter chambers, with said discharge opening having an axis that is disposed in such a way as to produce a flushing medium stream that is directed downwardly onto said respective filter sheet.

19. A filter apparatus according to claim 17, in which at least some of said unfiltered fluid outlet channels, filtrate outlet channels, and flushing channels are each formed by channel portions formed in said filter elements.

20. A filter apparatus according to claim 18, in which said axes of at least a portion of said flushing medium discharge openings are disposed in a first vertical plane that forms a first angle of less than 90° with a reference plane that includes said central filter axis as well as an axis of said flushing channel.

21. A filter apparatus according to claim 20, in which for each of said filter chambers at least two flushing medium discharge openings are provided, with a first one of said discharge openings having an axis disposed in said first vertical plane, and with a second one of said discharge openings having an axis disposed in a second vertical plane that extends at least nearly radially relative to said central filter axis.

22. A filter apparatus according to claim 20, in which for each of said filter chambers at least two flushing medium discharge openings are provided, with a first one of said discharge openings having an axis disposed in said first vertical plane, and with a second one of said discharge openings having an axis disposed in a second vertical plane that forms a second angle of less than 90° with said vertical reference plane.

23. A filter apparatus according to claim 22, in which said first and second angles open toward different sides of said reference plane.

24. A filter apparatus according to claim 23, which includes two flushing channels which are offset by 180° relative to one another about said central filter axis.

25. A filter apparatus according to claim 1, in which said filtrate collection area provided below each said filter sheet is formed by a drainage mesh.

26. A filter apparatus according to claim 25, in which each of said filter sheets is formed of a mesh arrangement that expediently includes said drainage mesh and comprises a plurality of layers, each of which comprises at least one mesh, with at least a portion of said meshes expediently being interconnected.

27. A filter apparatus according to claim 26, in which each of said mesh arrangements is welded into said filter elements.

* * * * *

UNITED STATES PATENT AND TRADEMARK OFFICE
CERTIFICATE OF CORRECTION

PATENT NO. : 5,069,791

DATED : December 3, 1991

INVENTOR(S) : HANS F. BECKER ET AL

It is certified that error appears in the above-identified patent and that said Letters Patent is hereby corrected as shown below:

On Title Page, Inventors should read;

[75] Inventors: Hans F. Becker, Gensingen; Dieter Rudolf Krulitsch, Bad Kreuznach, both of Fed. Rep. of Germany Signed and Sealed this Twelfth Day of January, 1993

Attest:

DOUGLAS B. COMER

*Attesting Officer*  *Acting Commissioner of Patents and Trademarks*